US008435639B2

(12) United States Patent
Rokowski et al.

(10) Patent No.: US 8,435,639 B2

(45) Date of Patent: May 7, 2013

(54) ELASTOMERIC ROOF COATINGS WITH ADHESION TO WEATHERED THERMOPLASTIC POLYOLEFIN (TPO) ROOFING MEMBRANES

(75) Inventors: Joseph M. Rokowski, Barto, PA (US); Jonathan M. Wegner, Duluth, MN (US)

(73) Assignee: Rohm and Haas Company, Philadelphia, PA (US)

( * ) Notice: Subject to any disclaimer, the term of this patent is extended or adjusted under 35 U.S.C. 154(b) by 289 days.

(21) Appl. No.: 12/975,418

(22) Filed: Dec. 22, 2010

(65) Prior Publication Data

US 2011/0159300 A1 Jun. 30, 2011

Related U.S. Application Data

(60) Provisional application No. 61/335,012, filed on Dec. 30, 2009.

(51) Int. Cl.

| | |
|---|---|
| ***B32B 9/04*** | (2006.01) |
| ***B05D 3/02*** | (2006.01) |
| ***C07F 7/18*** | (2006.01) |

(52) U.S. Cl.

USPC ............................ 428/447; 427/387; 524/188

(58) Field of Classification Search ........................ None

See application file for complete search history.

(56) References Cited

U.S. PATENT DOCUMENTS

| | | | | |
|---|---|---|---|---|
| 4,196,254 | A | 4/1980 | Puskadi | |
| 4,486,565 | A | 12/1984 | Benjamin | |
| 4,981,728 | A | 1/1991 | Homma | |
| 5,314,562 | A | 5/1994 | McDonnell | |
| 5,521,266 | A | 5/1996 | Lau | |
| 5,527,619 | A * | 6/1996 | Rokowski et al. | 428/452 |
| 6,528,581 | B1 * | 3/2003 | Kelly et al. | 524/833 |
| 2006/0122319 | A1 | 6/2006 | Kneafsey | |
| 2008/0145564 | A1 | 6/2008 | Allam | |
| 2009/0035587 | A1 | 2/2009 | Killilea | |

FOREIGN PATENT DOCUMENTS

| | | | |
|---|---|---|---|
| EP | 0412516 | A1 | 2/1991 |
| EP | 0432921 | A1 | 6/1991 |
| JP | 55092742 | A | 7/1980 |
| WO | 8805449 | | 7/1988 |
| WO | 2009022012 | | 2/2009 |
| WO | 2009074365 | | 6/2009 |

* cited by examiner

*Primary Examiner* — Sheeba Ahmed

(74) *Attorney, Agent, or Firm* — Andrew E. C. Merriam

(57) ABSTRACT

The present invention provides elastomeric roof coatings made from emulsion copolymers having a glass transition temperature (Tg) of from −25° C. to 20° C., a weight average molecular weight of from 50,000 to 150,000, a weight average particle size of from 100 to 500 nm, and copolymerized a monomer mixture of 20 wt. % or more, preferably 25 wt. % or more, of one or more hydrophobic monomer chosen from $C_6$ to $C_{24}$ alkyl (meth)acrylates and 0.2 to 5 wt. % of one or more ethylenically unsaturated acid functional monomer and containing aminosilanes which give excellent wet adhesion to weathered substrates, especially weathered thermoplastic polyolefin (TPO).

10 Claims, No Drawings

ELASTOMERIC ROOF COATINGS WITH ADHESION TO WEATHERED THERMOPLASTIC POLYOLEFIN (TPO) ROOFING MEMBRANES

This application claims the benefit of priority under 35 U.S.C. §119(e) of U.S. Provisional Patent Application No. 61/335,012 filed on Dec. 30, 2009.

The present invention relates to coating compositions for low VOC coatings with excellent adhesion to weathered substrates, e.g. roofing membranes, comprising emulsion copolymers and one or more aminosilane. More particularly, it relates to aqueous coating compositions comprising one or more emulsion copolymer made from a monomer mixture comprising hydrophobic monomer and carboxylic acid or anhydride functional monomer, one or more hydrophilic dispersant and one or more aminosilane, as well as to coatings therefrom having good adhesion to weathered thermoplastic polyolefin (TPO).

In recent years, the popularity of TPO roofing membranes which are less expensive than their predecessor elastomeric rubber roofing membranes has increased substantially. However, the durability of TPO roofing membranes has in often proven unreliable. Like all other roofing coverings, TPO roofing membranes applied to low slope commercial roofs deteriorate via several mechanisms. Ultraviolet (UV) radiation can cause degradation of the polymer by free radical formation and polymer chain scission. Such degradation effects are amplified by oxidation mechanisms which further degrade the polymer. In addition, halogenated additives used to increase the fire resistance of a TPO membrane can undergo UV induced dehydrohalogenation, creating residual by products that react with and degrade formulated UV absorbers and hindered amine light stabilizers. This in turn causes further membrane degradation. The cumulative effects of this degradation can be seen in chalking, micro cracks, shrinkage and accelerated erosion of the surface of the membrane. For similar reasons, there also exists a problem with the degradation of bitumen or asphalt roofing membranes.

For maintenance of weathered and degraded roofing membranes or other films or laminates use, coatings offer a possible solution. Weathered TPO can be coated with solvent borne or high solids SEBS (Styrene-Ethylene-Butylene-Styrene) or PUR (polyurethane) coatings. However, such solvent borne coatings have a 300 to 400 g/Liter or greater volatile organic chemicals (VOCs) content. Further, the odor of such coatings is unsafe and the solvent can bite into the existing roofing surface in use and potentially dissolve it away in spots. In addition, isocyanates used in the polyurethane coatings can cause health issues for the applicator. Meanwhile, high solids coatings have proven very expensive. One can also surface wipe weathered membranes with solvent to enhance adhesion; however, this approach also poses VOC and odor issues, as well as flammability issues.

To avoid the odor, pollution and safety issues posed by use of solvent borne coatings, waterborne elastomeric coatings have been proposed. Nevertheless, waterborne coatings typically do not have good adhesion to TPO roofing membranes or other TPO surfaces because of poor wetting of the surface and the inability to adhere to a low energy surface containing olefinic material.

U.S. Pat. No. 6,528,581, to Kelly et al., discloses compositions for mastic coatings comprising emulsion copolymers made from at least one hydrophobic monomer. The compositions may be used in elastomeric roof coatings which have improved adhesion to asphalt based products. One such product, modified bitumen roofing membrane, contains about 15% by weight of atactic polypropylene (APP). Coatings for weathered substrates, such as weathered TPO, are not disclosed. Such compositions provide coating compositions that do not possess acceptable adhesion to weathered TPO roofing membranes or other weathered TPO materials.

Accordingly, the present inventors have endeavored to solve the problem of providing effective waterborne coatings for maintenance or repair of weathered TPO roofing membranes.

In accordance with the present invention, aqueous compositions for coating weathered TPO and other weathered elastomeric substrates comprise (i) one or more emulsion copolymer having a glass transition temperature (Tg) of from −25° C. to 20° C., a weight average molecular weight of 150,000 or less, or, preferably, 100,000 or less or, preferably, 50,000 or more, and a weight average particle size of from 100 to 500 nm, preferably from 200 to 350 nm, more preferably 250 nm or more, the emulsion copolymer prepared by copolymerizing a monomer mixture of (a) 20 wt. % or more, preferably, 30 wt. % or more, or, more preferably, 35 wt. % or more, of one or more hydrophobic monomer chosen from $C_6$ to $C_{24}$ alkyl (meth)acrylates, preferably $C_8$ to $C_{18}$ alkyl (meth)acrylates, (b) up to 20 wt. %, preferably, up to 5 wt. % of one or more vinyl aromatic monomer, wherein the weight of (a) and (b) together constitute at least 25 wt. % or more, preferably, 30 wt. % or more, and, more preferably, 35 wt. % or more of the total weight of the monomer mixture, (c) up to 75 wt. %, or 0.5 wt. % or more, or up to 65 wt. % of one or more vinyl comonomer, such as a $C_1$ to $C_4$ alkyl (meth)acrylate, preferably, methyl methacrylate, and (d) 0.2 to 5 wt. %, preferably, 2.5 wt. % or less, of one or more ethylenically unsaturated acid functional monomer, such as an ethylenically unsaturated carboxylic acid, preferably acrylic or methacrylic acid, all monomer weight % s based on the total weight of monomers in the monomer mixture used to make the emulsion copolymer, (ii) one or more aminosilane, preferably an amino alkoxysilane, and, optionally, (iii) the combination of one or more pigment, extender or filler with one or more hydrophilic dispersant, e.g. an alkali(ne) metal salt of an acid homopolymer, wherein the composition is substantially zinc free.

In a preferred embodiment, monomer (a) is a fatty (meth) acrylate, such as a $C_{12}$ to $C_{20}$ alky (meth)acrylate, for example, lauryl methacrylate or stearyl methacrylate.

The emulsion copolymer may be a single emulsion copolymer or a blend of two or more emulsion copolymers wherein at least one is the emulsion copolymer of the present invention.

The amount of aminosilane ranges 0.4 wt. % or more, or up to 2.0 wt. %, preferably 0.5 wt. % or more, or, more preferably, 0.7 wt. % or up to 1.5 wt. % based on the total weight of polymer solids.

The amount of hydrophilic dispersant may range from 0.1 wt. % or more, or up to 2.0 wt. %, preferably, up to 0.7 present invention, or, more preferably, 0.2 wt. % or more or up to 0.4 wt. %, all weight % s based on the total weight of pigment, filler and extender solids.

Preferably, the coating composition has a VOC content of 100 g/L or less, preferably, 50 g/L or less.

In one embodiment, wherein the copolymerizate of monomer (b) is not present in the emulsion copolymer, the amount of ethylenically unsaturated acid functional monomer (d) ranges up to 2.5 wt. %.

In another embodiment to insure low temperature flexibility, the Tg of the emulsion copolymer may be 5° C. or less.

In yet still another embodiment, the coating composition comprises a pigmented formulation such as a white roof coating composition. Such compositions may comprise one or more of any of an extender, such as calcium carbonate, a pigment, such as titanium dioxide or iron oxide, a filler, and mixtures thereof. Alternatively, the compositions can consist essentially of one or more extender for use in making protective clearcoats.

The solids level of aqueous coating compositions may range 15 wt. % or higher and up to 80 wt. %, preferably, 40 wt. % or higher, or, more preferably, 50 wt. % or higher, or, even more preferably, 60 wt. % or higher.

In another aspect, the present invention provides methods of making coatings comprise applying the coating compositions of the present invention to a weathered elastomeric substrate, followed by drying (at ambient temperature and humidity or at elevated temperature and ambient humidity). Drying can comprise, for example, ambient drying.

The present invention also provides substrates coated with the compositions of the present invention, including weathered TPO substrates, new TPO, patched or improved TPO, modified bitumen, both weathered and new, weathered silicone roof coating, and EPDM rubber substrates. For example, the coating compositions can be used as a maintenance product on a roof substrate or automotive TPO substrate which can be a weathered substrate.

All ranges recited are inclusive and combinable. For example, a disclosed proportion of 0.4 wt. % or more aminosilane, or up to 2.0 wt. %, preferably 0.5 wt. % or more, or, preferably 1.5 wt. % or less, or more preferably, 0.7 wt. % or more, based on the total weight of polymer solids would include proportions of from 0.4 to 2.0 wt. %, or of from 0.4 to 1.5 wt. %, or of from 0.4 to 0.7 wt. %, or of from 0.4 to 0.5 wt. %, or of from 0.5 to 2.0 wt. %, or of from 0.5 to 1.5 wt. %, or of from 0.5 to 0.7 wt. %, or of from 0.7 to 2.0 wt. %, or of from 0.7 to 1.5 wt. %, or of from 1.5 to 2.0 wt. %.

Unless otherwise indicated, all temperature and pressure units are room temperature and standard pressure.

All phrases comprising parentheses denote either or both of the included parenthetical matter and its absence. For example, the phrase "(meth)acrylate" includes, in the alternative, acrylate and methacrylate.

As used herein, the term "(meth)acrylate" means acrylate, methacrylate, and mixtures thereof and the term "(meth) acrylic" used herein means acrylic, methacrylic, and mixtures thereof.

As used herein, the term "pigment volume concentration" or % PVC refers to the quantity calculated by the following formula:

$$PVC\ (\%) = \frac{(\text{volume of pigment}(s) + \text{volume extender}(s) + \text{volume of filler}(s))}{\text{Total dry volume of coating}} \times 100$$

As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer.

As used herein, the term "glass transition temperature" or "Tg" refers to the mid-point glass transition temperature of a polymer as determined by differential scanning calorimetry, in accordance with ASTM E-1356 (1991).

As used herein, unless otherwise indicated, the term "calculated Tg" or "calculated glass transition temperature" refers to the Tg of a polymer calculated by using the Fox equation (T. G. Fox, *Bull. Am. Physics Soc.*, Volume 1, Issue No. 3, page 123 (1956).

As used herein, the term "substantially zinc free" refers to a composition containing less than 750 ppm of zinc, whether in elemental form, i.e. as a metal, as an ion or as that portion of a compound that is itself zinc, such as the zinc in zinc oxide, or a salt.

As used herein, unless otherwise indicated, the term "weight average particle size" means the particle size as determined by light scattering (LS) using a BI-90 particle size analyzer, Brookhaven Instruments Corp. (Holtsville, N.Y.).

As used herein, the term "weight average molecular weight" or "MW" refers to the weight average molecular weight as measured by aqueous gel permeation chromatography (GPC) against a polyacrylic acid (PAA) standard of a copolymer that is hydrolyzed in KOH.

As used herein, the phrase "wt. %" stands for weight percent.

The present inventors have found that coating compositions that comprise one or more emulsion copolymer made by copolymerizing hydrophobic monomer and ethylenically unsaturated acid functional monomer and having weight average molecular weight of from 10,000 to 150,000, a weight average particle size of from 100 to 500 nm, and a low Tg to insure adequate flexibility and film formation in use conditions, gives improved adhesion to weathered elastomeric substrates, e.g. TPO, when combined with one or more hydrophilic dispersant, such as the sodium salt of poly(acrylic acid), and one or more aminosilane adhesion promoter in the absence of substantial amounts of zinc, e.g. zinc metal or zinc oxide, etc. The present invention runs counter to expectations that a hydrophobic dispersant is necessary for good water resistance and adhesion of an elastomeric roof coating or adhesion thereto. Remarkably, the compositions of the present invention even perform well at very low VOC levels, such as 35 g/L.

The emulsion copolymer of the present invention comprises the emulsion copolymerization product of one or more hydrophobic monomer (a), one or more acid monomer (d), and, owing to the difficulty in efficiently polymerizing hydrophobic monomers, one or more vinyl monomer (c), with the vinyl aromatic monomer optional or, optionally, absent. As is known in the art, the monomer mixture is selected to give the desired Tg. Preferably, the emulsion copolymer comprises the copolymerization product of a monomer mixture that contains no styrene or vinyl aromatic monomer.

Suitable hydrophobic monomers (a) may include, for example, ethylhexyl acrylate (EHA), octyl methacrylate, isooctyl methacrylate, decyl methacrylate (n-DMA), isodecyl methacrylate (IDMA), lauryl methacrylate (LMA), pentadecyl methacrylate, stearyl methacrylate (SMA), octyl acrylate, isooctyl acrylate, decyl acrylate, isodecyl acrylate, lauryl acrylate (LA), the ($C_{12}$ to $C_{15}$) alkyl methacrylates, cyclohexylacrylate and cyclohexylmethacrylate. Preferred hydrophobic monomers are the fatty or $C_{12}$ to $C_{18}$ alkyl (meth)acrylates, such as LMA, SMA and n-DMA, as well as IDMA.

Suitable vinyl comonomers (c) may include, for example, vinyl monomers, such as, for example, (meth)acrylic ester monomers including $C_1$ to $C_6$ alkyl (meth)acrylates, such as methyl methacrylate (MMA), ethyl (meth)acrylate, butyl acrylate (BA); (meth)acrylamide or substituted (meth)acrylamides; (meth)acrolein; isocyanatoalkyl (meth)acrylates;

butadiene; ethylene; vinyl acetate or other vinyl esters; vinyl halides; amine functional monomers, such as, for example, N,N'-dimethylamino (meth)acrylate; and (meth)acrylonitrile. Preferably, the vinyl comonomer is a $C_1$ to $C_4$ alkyl (meth)acrylate, more preferably, methyl methacrylate. In an alternative embodiment, small amount, up to 2 wt. % of the monomer mixture can comprise an amino alkoxysilane functional momoner, such as, for example, methacryloyl aminopropyl trimethoxy silane.

To improve stability in aqueous systems, the emulsion copolymer includes, for example, acid functionality. Suitable ethylenically unsaturated acid functional monomers (d) may include addition polymerizable carboxylic acids, anhydrides, phosphorous containing or sulfur containing acid functional monomers. Examples of suitable acid monomers may include, for example, maleic acid or anhydride, phosphoalkyl (meth)acrylate, (meth)acrylamidopropane sulfonate and, preferably, methacrylic acid (MAA) and acrylic acid (AA).

The emulsion copolymer can be prepared by emulsion polymerization techniques well known in the art for making emulsion copolymers from hydrophobic monomer vinyl comonomers. For example, U.S. Pat. No. 5,521,266 discloses suitable polymerization processes for suitable for forming emulsion copolymers made from one or more hydrophobic monomer. The hydrophobic monomer can be complexed with a macromolecular organic compound having a hydrophobic cavity by mixing them to form a complexed mixture, and charging the complexed mixture, along with any other monomers to a reaction vessel. Alternatively, a macromolecular organic compound having a hydrophobic cavity may be added to the reaction vessel before, during or after the monomer mixture has been charged. Suitable macromolecular organic compounds having a hydrophobic cavity may include, for example, cyclodextrin and cyclodextrin derivatives; cyclic oligosaccharides having a hydrophobic cavity such as cycloinulohexose, cycloinuloheptose, and cycloinuloctose; calyxarenes; and cavitands. The ratio of hydrophobic monomer to the macromolecular organic compound having a hydrophobic cavity may range from 1:5 to 5000:1, preferably 1:1 to 1000:1.

The emulsion copolymer of the present invention has a relatively large particle size of from 200 to 500 nm which improves adhesion and increases the critical % PVC of compositions containing them, i.e. the non-binder loading capacity of the coating compositions. Suitable emulsion polymerization methods for making such large particle sizes are conventional in the art and include, for example, polymerizing with small amounts of surfactant, such as, for example, from 0.01 to 0.4 wt. %, based on the total weight of monomers, preferably, 0.08 to 0.32 wt. %, polymerizing under low shear during polymerization, increasing the ion balance or salt concentration of the composition before, during or after polymerization and in use, and combinations thereof. In addition, use of an amount of surfactant below 0.4 wt. %, based on the total weight of monomers, may improve the water resistance of coatings or films made from the coating compositions.

To improve blister resistance and adhesion, suitable emulsion copolymers have a weight average molecular weight of 10,000 to 150,000, preferably 50,000 or more, or, preferably, 100,000 or less provide. In addition, emulsion copolymers of such a molecular weight raise the critical % PVC of compositions containing them. Such emulsion copolymers may be made by conventional methods, such as, for example, including in the polymerization a wide variety of chain transfer agents. These include, for example, alkyl mercaptans, halogen compounds, and other well-known agents. A chain transfer agent such as, for example, n-dodecylmecaptan may be used in amounts ranging from 0.1 wt. %, based on the weight of total monomers, to 2.0 wt. %, or preferably, 0.2 to 1.0 wt. %, or, more preferably, 0.25 to 0.8 wt. %. Preferably, the chain transfer agent is hydrophobic, such as n-dodecyl mercaptan (n-DDM or DDM) or any $C_4$ to $C_{18}$ mercaptan.

In one example of a suitable emulsion polymerization method, monomer mixture is subject to gradual addition emulsion polymerization with cyclodextrin with 0.01 to 0.4 wt. %, based on total monomer weight, of a nonionic and/or anionic surfactant. Alternatively, the same compositions can be emulsion polymerized in a shot polymerization with up to 0.2 wt. % of surfactant and a preferred level of chain transfer agent.

One example of a suitable emulsion, copolymer is a 35LMA/32BA/31.4MMA/1.6MAA/0.3nDDM copolymer where the numbers represent wt. % of monomer in the monomer mixture, and having a Tg of −10° C. and a 330 nm weight average particle size and 0.1%, based on the total weight of the monomer mixture and the chain transfer agent, of a postadded UV absorber.

Suitable emulsion copolymers for blending in with any emulsion copolymer of the present invention may include, for example, 85 BA/12.35 MMA/1.65 MAA/1 ethylene ureido functional ethyl methacrylate monomer, where the numbers represent wt. % of monomer in the monomer mixture, and having a 350 nm weight average particle size, a Tg of −40° C. and 0.3%, based on the total weight of the monomer mixture and the chain transfer agent, of a postadded UV absorber.

Suitable emulsion copolymers of the present invention may also include copolymer C, 35 EHA/32BA31.4MMA/1.6MAA/0.3 nDDM where the numbers represent wt % of monomers in the monomer mixture and having a 350 nm weight average particle size, a Tg of −10° C. and 0.1% based on the total weight of the monomer mixture and the chain transfer agent of post added UV absorber.

The compositions of the present invention may comprise 15-65 wt. % of emulsion copolymer solids, preferably, 40 wt. % or more, or, more preferably, 50 wt. % or more, all weight % s based on the total solids of the compositions, including any fillers, extenders and pigments and any solid additive present in a coating or film made from the compositions.

The aminosilane of the present invention comprises an amino-alkyl functional group and is hydrolysable, having, for example, one or more alkoxy group or aryl(alkyl)oxy functional group. Preferably, the amino silane has two or more amino functional groups and two or, more preferably, three hydrolysable groups, i.e. tri-alkoxy.

In another embodiment, improved adhesion is observed with hydrolysable epoxysilanes, which preferably have two or three hydrolysable groups. The same amount of epoxysilane is used as aminosilane. Combinations of the epoxysilanes and aminosilanes may be used.

For weathered TPO, vinyl alkoxysilanes may be used in the same amount as the amino alkoxysilane.

Examples of suitable aminosilanes include Momentive™ Silquest™ A-1120 Momentive Performance Materials, Albany, N.Y.) or Dow-Corning Z-6020 (Dow Corning, Midland, Mich.), each of which are aminoethylaminopropyl trimethoxysilanes. Other suitable silanes include, for example, Dow Corning Z-6040, which is glycidoxypropy trimethoxysilane, and Silquest Wetlink™ 78, Momentive Performance Materials, Albany, N.Y., a glycidoxypropylmethyl diethoxysilane.

Compositions of the present invention also comprise one or more hydrophilic dispersant, such as a polyMAA or a polyacid salt, e.g. alkali(ne) metal salt, for example, polyMAA, its Na salt. Any hydrophilic dispersant that can stabilize pigments, extenders and/or fillers and wet out substrate surface in use may be used, such as, for example, copolymer dispersants like Tamol™ 851 (Na poly(MAA)) or 1124 (poly(AA-co-hydroxypropyl acrylate)) dispersants (Dow Chemical, Midland, Mich.), or Rhodoline™ 286N dispersants (Rhodia, Cranberry, N.J.), Disponil™ Fes-77, a fatty alcohol polyglycol ether sulfate available from (Cognis, Cincinnati, Ohio) polybasic acid salts, such as potassium tripolyphosphate (KTPP), polycarboxylic acid salts, copolymer acid salts, alkali soluble resin salts, phosphoethyl methacrylate (PEM) polymer and copolymer dispersants, mono or oligo-phosphorous or sulfur containing acid salts, which can be organic or inorganic, e.g KTPP or sulfonates.

Suitable hydrophilic dispersants contain the polymerization product of less than 30 wt. %, preferably 20 wt. % or less of monomers other than hydrophilic monomers like alkyl (meth)acrylates, dienes or olefins, based on the total weight of monomers used to make the copolymer. Preferred hydrophilic surfactants have a weight average molecular weight of 5,000 or more, preferably 8,500 or more.

Hydrophilic dispersants do not include emulsion copolymer dispersants or block copolymer dispersants comprising more than 20 wt. %, based on the total weight of copolymerized monomers, of a block that would not form a water soluble homopolymer (≧50 g/L dissolves at room temp upon mixing) at the weight average molecular weight of the dispersant block in use. Thus, if a block of a monomer in a block copolymer has a weight average molecular weight of 1,000 in the dispersant, then a homopolymer having a weight average molecular weight of 1,000 of the same monomer used to make the block in the dispersant is evaluated to see if it is water soluble.

To avoid excessive water sensitivity, and possible loss of adhesion, hydrophilic dispersants should be used in amounts of 2 wt. % or less, based on the total polymer solids in the compositions.

The compositions of the present invention may additionally comprise one or more of pigments, extenders, fillers, thickeners, such as hydroxyethylcellulose (HEC) or modified versions thereof, UV absorbers, surfactants, coalescents, wetting agents, thickeners, rheology modifiers, drying retarders, plasticizers, biocides, mildewicides, defoamers, colorants, waxes, and silica.

Preferably, the compositions are pigmented and also contain extenders or fillers. Suitable pigments may be, such as, for example, titanium dioxide, hollow sphere or void containing polymer pigments, or iron oxides. Suitable extenders may be, for example, calcium carbonate, clay, mica, talc, alumina silicates, and nepheline syenite.

To insure that they do not impair adhesion to the substrate, pigments, extenders or fillers should have a pH of less than 7.5 or, if their pH is 7.5 or higher they should either have a weight average particle size of 5 μm or higher or they should be used at a % PVC of 30 or less. Extenders with a weight average particle size of less than 5 μm can decrease the critical PVC of a coating composition. Preferred fillers or extenders are talc and mica or their admixture with other extenders.

In pigmented formulations of the present invention, compounds having zinc oxide, zinc containing additives or zinc ions are avoided. Zinc reduces the adhesion of the coating to weathered TPO. Accordingly, the compositions are substantially zinc free and contain less than 750 ppm of Zn, whether as metal, ions or as that portion of a compound that is itself zinc, the weight based on the total solids of the composition, preferably less than 100 ppm.

In a preferred embodiment, the pigmented compositions are suitable for making white roof coatings or white roof maintenance coatings.

To insure proper adhesion to substrates, the % PVC of suitable pigmented compositions is 55% or below, such as 20% to 50%, or, preferably, 35% or more, or less than 45%.

To insure enhanced weatherability, the compositions may include one or more UV absorber or light stabilizer, such as benzophenone (BZP), or butylated hydroxytoluene (BHT) or hindered amines in the total amount of from 0.01 to 1 wt. %, based on the total solids of the composition, preferably, 0.05 wt. % or more or up to 0.5 wt. %.

To formulate the coating compositions of the present invention, the silane can be added with stirring, such as overhead stirring, preferably before pigments, fillers or extenders are added.

In one example of a suitable composition, 100 weight parts of an emulsion copolymer of the present invention at 55 wt. % solids is formulated with 2.2 weight parts of either of Disponil™ Fes-77 at 25 wt. % solids or Triton™ X-405 at 70 wt. % solids, and 0.55 grams of Momentive™ Silquest™ A-1120 amino alkoxysilane and is, optionally, pigmented.

In another example of a suitable composition, 80 weight parts of an emulsion copolymer suitable for blending with the emulsion copolymer of the present invention having a Tg of −40° C., at 55 wt. % solids, is blended with 20 weight parts of an emulsion copolymer of the present invention at 55 wt. % solids, and is then formulated with 2.2 weight parts of either of Disponil™ Fes-77™ at 25 wt. % solids or Triton™ X-405 at 70 wt. % solids, and 0.55 grams of Momentive™ Silquest™ A-1120 amino alkoxysilane. The resulting formulation is then, optionally, pigmented.

The compositions can be used on any weatherable substrate, such as a roof or an automotive substrate, e.g. a bumper, with preferred substrates being weathered substrates chosen from weathered TPO, weathered silicone rubber and weathered EPDM rubber. Substrates can also be prepared with physical abrasion, flame ionization, powerwashing with water, applying an aqueous cleaning solution, such as 5-10% by weight trisodium phosphate, or other cleaning agents, followed by powerwashing with water, or plasma treatment prior to coating. Other suitable substrates include modified bitumen membrane. The compositions are preferably used as topcoats or topcoat maintenance coatings, especially if formulated with UV absorbers or light stabilizers, or can be used as the basecoat or maintenance basecoats in two coat system, e.g. with a topcoat or mastic.

EXAMPLES

The following Examples illustrate the advantages of the present invention.

Ingredient key: The following ingredients used in the Examples, below:

Emulsion Copolymer A: A 35LMA/32BA/31.4MMA/1.6MAA/0.3nDDM copolymer, where the numbers represent wt. % of monomer in the monomer mixture, and having a Tg of −10° C. and a 330 nm weight average particle size, 0.1% of a postadded UV absorber, and 0.5% Fes-77 based on the total weight of polymer solids (monomer mixture and chain transfer agent);

Emulsion Copolymer B: A 85 BA/12.35 MMA/1.65 MAA/1 ethylene ureido ethyl methacrylate monomer, where the numbers represent wt. % of monomer in the monomer mixture, and having a 350 nm weight average particle size, a Tg of −40° C. and 0.3%, based on the total weight of the monomer mixture and the chain transfer agent, of a postadded UV absorber;

Emulsion Copolymer C: A 35EHA/32BA/31.4MMA/1.6MAA/0.3nDDM copolymer, where the numbers represent wt. % of monomer in the monomer mixture, and having a Tg of −10° C. and a 330 nm weight average particle size, 0.1% of a postadded UV absorber, and 0.5% Fes-77 based on the total weight of polymer solids (monomer mixture and chain transfer agent);

Aminoethylaminopropyl trimethoxysilane: Dow Corning Z-6020 Dow Corning, Midland, Mich.; Momentive™ Silquest™ A-1120 Momentive Performance Materials, Albany, N.Y., Wacker Geniosil™ GF-9, Adrian, Mich.

Vinyl trimethoxysilane: Dow Corning Z-6300 from Dow Corning, Midland, Mich.; Wacker Geniosil™ XL-10, Adrian, Mich., Momentive Silquest™ A-171, Momentive Performance Materials, Albany, N.Y.

Glycidoxypropyl trimethoxysilane: Dow Corning Z-6040 Dow Corning, Midland, Mich. Wacker Geniosil™ GF-80, Adrian, Mich. or Momentive Silquest™ A-187 from Momentive Performance Materials, Albany, N.Y.

Glycidoxypropylmethyl diethoxysilane: Wetlink™ Silquest™ 78 Momentive Performance Materials, Albany, N.Y.

Omya 12: Natural Ground Calcium Carbonate; weight average particle size 12 μm; pH 9.4; Omya, Johnsonburg, Pa.;

Omyacarb™ 2: Natural Ground Calcium Carbonate; weight average particle size 2 μm; pH 9.4; Omya;

Omya UF: Natural Ground Calcium Carbonate; weight average particle size 0.8 μm; pH 9.4; Omya;

Atomite™: Natural Ground Calcium Carbonate; weight average particle size 3.0 μm; pH 9.3; Emerys, Roswell, Ga.;

Icecap™ K: Kaolin Clay; weight average particle size 1.0 μm; pH 6.0; Tavcoo Chemical, Laguna Hills, Calif.;

ASP-170: Kaolin Clay; weight average particle size 0.4 μm; pH 6.5; BASF, Florham Park, N.J.;

Solem™ 432: Aluminum Trihydrate; weight average particle size 9.0 μm; pH 8.5; J.M. Huber, Havre de Grace, Md.;

Minex™ 4: Sodium potassium aluminum silicate; weight average particle size 7.5 μm; pH 9.9; Cary Co, Addison, Ill.;

Kadox™ 915: Zinc Oxide; weight average particle size 0.13 μm; pH 7.4; Zinc Corp. of America, Monaca, Pa.;

Heucophos™ ZCPP: Zinc calcium poly phosphate; weight average particle size 2.7 μm; pH 7.2; Heucotech Ltd, Fairless Hills, Pa.;

Nytal™ 300: Talc/magnesium silicate; weight average particle size 6.9 μm; pH 9.4; RT Vanderbilt, Norwalk, Conn.;

Mica 375: Potassium Aluminum silicate; weight average particle size 25 μm, pH 7.5; RT Vanderbilt, Norwalk, Conn.;

TiPure™ R-960: Titanium Dioxide; weight average particle size 0.5 μm; pH 7.2; DuPont, Wilmington, Del.;

Dispersbyk™ 190: High Molecular weight block copolymer dispersant; Byk USA, Fort Washington, Pa.;

Tamol™ 1254; Sodium salt of copolymer methacrylic acid, 3800 MW; Dow Chemical, Midland, Mich.;

Primal™ I-1955: Acrylic emulsion copolymer dispersing resin; Dow Chemical, Midland, Mich.;

Tamol™ 850: Sodium salt of homopolymer methacrylic acid, 13,000 MW; Dow Chemical Co, Midland, Mich.; and, Rinseable Primer RP-1: A mixture of inorganic salts and modified alkyl phenol ethoxylates; Dow Chemical Co, Midland, Mich.;

Substrate Key: Coatings on the following substrates, where indicated, were coated and tested.

Unweathered TPO: Firestone 1.14 mm (45 mils) white membrane, unexposed;

Weathered TPO: (i) Weathered Firestone 1.14 mm (45 mils) white TPO membrane from Firestone (Bridgestone Americas Inc., Nashville, Tenn.), exposed 4 years horizontal face up on a roof deck at Spring House Farm Exposure Station, Spring House, Pa.; (ii) Weathered Carlisle 1.14 mm (45 mils) white TPO membrane, exposed 6 months horizontal face-up on a roof deck at Spring House Pa.; Weathered Stevens (Dow, Midland Mich.) 1.14 mm (45 mils) white TPO membrane, exposed 12 years horizontal face-up in Atlanta, Ga.

Unweathered APP (Modified bitumen membrane): GAF Brai™ Supreme™ (GAF Materials Corp., Ennis, Tex.).

Weathered APP: GAF Brai™ Supreme™ Modified Bitumen exposed 5 years, horizontal face up on a roof deck a Rohm and Haas' Spring House Farm Exposure Station, Spring House, Pa.

The test methods used to evaluate the coating compositions were, as follows:

Dry and Wet Adhesion: Adhesion was tested using the ASTM C794. Except as otherwise stated, all weathered substrates were 4 year exterior exposed Firestone 1.14 mm (45 mil) TPO roofing membranes. Substrates were exposed horizontal face-up at an outdoor site, the Spring House Farm, Pa. Exposure Station. The coating was applied by brush at a spread rate to provide 0.5 mm thickness of dry coating (i.e. 126 g of wet coating/square centimeters). While the coating was still wet, a 2.56 cm wide piece of cotton airplane scrim is embedded in the coating. Unless otherwise indicated, the coating was allowed to dry for 14 days at 25° C./50% relative Humidity. Alternatively, the coated panel was dried in a 50 to 60° C. oven or in a vacuum oven. Half of the scrim was then pulled using an Instron tensile tester, Model TM, Instron Engineering Corp., Canton, Mass. at a pull rate of 5.12 cm/min. The coated panel was then immersed for 7 days in water and the remaining half of the scrim is immediately pulled with the tester while the coated panel is still wet.

Unless otherwise indicated, no preparation, pretreatment or cleaning of the substrate was performed. Criteria for good adhesion performance is a minimum adhesion peel value for wet adhesion of 2.8 Newtons (N) or greater with a failure mechanism that is cohesive, C, or delamination, D, but not adhesive, A.

In Examples 1 to 23 that follow, unless otherwise indicated the coating compositions were formulated by the method as shown in Table 1, below, having silanes added at 1% silane on polymer solids. In preparing the coating compositions, the water, dispersant, neutralizer and defoamer were charge to mixing kettle and, while mixing at a slow speed, the calcium carbonate and titanium dioxide was added to the kettle. To grind, the mixer was turned to high speed for 15-30 minutes, or until a good grind is obtained, i.e. Hegman reading of 4.5-5.0, followed by slowing the mixer to its lowest speed. For the letdown, the emulsion copolymer A, to which had previously been added Fes-77 and the silane, was added and then a mixture of defoamer, mildewcide, water and coalescent was added while stirring. In the premix, the propylene glycol and hydroxyethylcellulose powder were mixed in a separate container and added while stirring. Finally, final pH was adjusted to a minimum of 9.0 while stirring.

TABLE 1

| Pigmented Formulation of a Coating Composition | | | |
|---|---|---|---|
| Material (Chemical Name) | Proportion (Kg) | Volume (L) | Solids (wt. %) |
| Grind | | | |
| Water | 88.94 | 88.94 | 0 |
| Dispersant: Tamol ™ 850 (Polyacrylic acid sodium salt) | 5.01 | 4.18 | 30.0% |
| Neutralizer: Aqua Ammonia (28%) | 3.62 | 4.02 | 28% |
| Defoamer: Nopco ™ NXZ (Mineral Oil Derivative) | 3.63 | 3.99 | NA |
| Extender: Omyacarb ™ 12 ™ (Natural ground calcium carbonate) | 481.07 | 177.99 | 100% |
| Pigment: Ti-Pure R960 ™ (Titanium dioxide) | 120.26 | 31.07 | 100% |
| LetDown | | | |
| Emulsion Copolymer A | 579.64 | 551.68 | 55% |
| Silane | 3.19 | 2.89 | 100% |
| Defoamer: Nopco ™ NXZ (Mineral Oil defoamer) | 2.42 | 2.66 | N/A |
| Coalescent: Texanol ™ (ester alcohol) | 6.05 | 5.55 | 1.89% |
| Water | 104.37 | 104.37 | |
| Mildewcide: Rozone ™ 2000 (isothiazoline) | 6.05 | 5.55 | 20.0% |
| Premix: | | | |
| Solvent: Propylene Glycol | 15.7 | 15.15 | 0% |
| Thickener: Natrosol ™ 250 MXR (Hydroxyethylcellulose) | 5.33 | 4.10 | 100% |
| Totals | 1422.08 | 1000 | |

In the overall coating formulations shown in Table 1, above, the volume solids are 50.00%, the % PVC is 41.0%, the Density is 1.422 Kg/L, the VOC is 48 g/L, the weight solids are 64.70% and the wt. % of coalescent is 1.89%.

Example 1

A coating was formulated with Emulsion copolymer A into a coating with 1% silane on polymer solids, and at 41% PVC and 120 Kg/1000 Liters of TiO2 and was tested for adhesion to the substrate. Results are shown in Table 2, below.

As shown in Table 2, below, a comparison of Examples 1B and 1E, with epoxy alkoxysilane, and of Example 1D, with amino alkoxysilane, shows substantially better wet adhesion than Example 1C with vinyl alkoxysilane. Even though all coatings exhibit unacceptable failure mechanisms, the emulsion copolymer with amino alkoxysilane in Example 1D provides the greatest adhesion performance of the coating to unweathered TPO.

TABLE 2

| Adhesion to Untreated, Unweathered TPO Roofing Membrane (Firestone 1.14 mm (45 mils) TPO) | | | |
|---|---|---|---|
| | Adhesion (N) | | Failure Mechanism |
| EXAMPLE | Dry | Wet | Wet |
| 1A Comparative Emulsion copolymer A | 0.7 | 1.0 | A |
| 1B Emulsion copolymer A and glycidoxypropyl trimethoxysilane | 0.5 | 1.7 | A |
| 1C Emulsion copolymer A and vinyl trimethoxysilane | 0.7 | 1.4 | A |
| 1D Emulsion copolymer A and aminoethylaminopropyl trimethoxysilane | 0.9 | 3.3 | A |
| 1E Emulsion copolymer A and glycidoxypropylmethyl diethoxysilane | 0.7 | 2.0 | A |

Example 2

A coating was formulated as in Example 1 using 1% silane on polymer solids. Unweathered TPO membrane substrate was powerwashed with water @ 26 MPa. The coating was applied to the substrate by brush to yield a dry film thickness of 0.5 mm and tested for adhesion to the substrate. Results are shown in Table 3, below.

TABLE 3

| Adhesion to Unweathered TPO Roofing Membrane (Firestone 1.14 mm (45 mil) white TPO, Powerwashed with Water) | | | |
|---|---|---|---|
| | Adhesion (N) | | Failure Mechanism |
| Example | Dry | Wet | Wet |
| 2A Comparative Emulsion copolymer A | 1.6 | 1.3 | A |
| 2B Emulsion copolymer A and Glycidoxypropyl trimethoxysilane | 0.6 | 0.4 | A |
| 2C Emulsion copolymer A and Vinyl trimethoxysilane | 0.7 | 1.7 | A |
| 2D Emulsion copolymer A and aminoethylaminopropyl trimethoxysilane | 0.7 | 3.6 | A |
| 2E Emulsion copolymer A and glycidoxypropylmethyl diethoxysilane | 0.7 | 2.6 | A |

As shown in Table 3, above, comparison of the wet adhesion data in Examples 2C, 2D, and 2E, with amino alkoxysilane, vinylsilane and glycidoxypropylmethyl diethoxysilane was far better than in the Control Example 2A or in Example 2B with glycidoxypropyl trimethoxysilane. Accordingly, epoxysilane is not preferred for unweathered TPO membranes with power washing. Even though all coatings exhibit unacceptable failure mechanisms, the emulsion copolymer with amino alkoxysilane in Example 2D provides the greatest adhesion performance of the coating to unweathered TPO.

Example 3

A coating was formulated as in Example 1 using 1% silane on polymer solids and applied to the white TPO membrane substrate Firestone 1.14 mm (45 mils) weathered 4 years at Spring House Farm exposure Station, Spring House, Pa. The TPO membrane was powerwashed with water @ 26 MPa. The coating was applied by brush to yield a dry film thickness of 0.5 mm. and tested for adhesion to the substrate. Results are shown in Table 4, below.

As shown in Table 4, below, adhesion for the formulations in Example 3D containing emulsion copolymer and amino alkoxysilane substantially improved for powerwashed weathered TPO membranes compared to powerwashed new membranes and the failure mechanism is acceptable delamination. Only the amino alkoxysilane containing formulations passed the adhesion test. In Example 3C, vinyl alkoxysilane containing formulations exhibited good dry adhesion to the weathered TPO substrate, with an unacceptable failure mechanism.

TABLE 4

Adhesion to Weathered TPO Roofing Membrane Powerwashed with Water

| | Adhesion (N) | | Failure Mechanism |
|---|---|---|---|
| Example | Dry | Wet | Wet |
| 3A Comparative Emulsion copolymer A | 12.6 | 4.5 | A |
| 3B Emulsion copolymer A and glycidoxypropyl trimethoxysilane | 8.2 | 0.4 | A |
| 3C Emulsion copolymer A and vinyl trimethoxysilane | 13.3 | 3.0 | A |
| 3D Emulsion copolymer A and aminoethylaminopropyl trimethoxysilane | 14.4 | 4.2 | D |
| 3E Emulsion copolymer A and glycidoxypropyl trimethoxysilane | 5.8 | 2.4 | A |

Example 4

A coating was formulated as in Example 1 using 1% silane on polymer solids, and the atactic polypropylene (APP) modified bitumen (mod bit) membrane substrate, unweathered GAF US Intec Brai® Supreme™, was coated and tested for adhesion to the substrate. Results are shown in Table 5, below.

TABLE 5

Adhesion to Unweathered Smooth Surface APP Modified Bitumen

| | Adhesion (N) | | Failure Mechanism |
|---|---|---|---|
| Example | Dry | Wet | Wet |
| 4A Comparative Emulsion copolymer A | 4.1 | 4.3 | A |
| 4B Emulsion copolymer A and glycidoxypropyl trimethoxysilane | 3.4 | 3.4 | A |
| 4C Emulsion copolymer A and vinyl trimethoxysilane | 4.7 | 3.4 | A |
| 4D Emulsion copolymer A and aminoethylaminopropyl trimethoxysilane | 2.2 | 4.3 | C |
| 4E Emulsion copolymer A and glycidoxypropylmethyl diethoxysilane | 2.4 | 2.4 | A |

As shown in Table 5, above, adhesion to unweathered mod bit membrane is improved for the aminoalkoxysilane containing emulsion copolymer. Only the coating with the emulsion copolymer with amino alkoxysilane in Example 4D exhibited an acceptable failure mechanism.

Example 5

A coating was formulated as in Example 1 using 1% silane on polymer solids. An APP mod bit membrane substrate, GAF US Intec™ Supreme, weathered 5 years on a flat roof at Spring House Pa., was powerwashed with water @ 26 MPa. The coating was applied by brush to yield a dry thickness of 0.5 mm and tested for adhesion to the substrate. Results are shown in Table 6, below.

TABLE 6

Adhesion to 5 year Weathered Smooth Surface APP Modified Bitumen

| | Adhesion (N) | | Failure Mechanism |
|---|---|---|---|
| Example | Dry | Wet | Wet |
| 5A Comparative Emulsion copolymer A | 8.9 | 3.4 | A |
| 5B Emulsion copolymer A and glycidoxypropyl trimethoxysilane | 3.5 | 2.6 | A |
| Emulsion copolymer A and vinyl trimethoxysilane | 5.1 | 2.7 | A |
| 5D Emulsion copolymer A and aminoethylaminopropyl trimethoxysilane | 7.5 | 3.6 | A/C |
| 5E Emulsion copolymer A and glycidoxypropylmethyl diethoxysilane | 8.9 | 1.9 | A |

As shown in Table 6, above, adhesion to a weathered mod bit membrane is improved for the amino alkoxysilane containing emulsion copolymer formulation, which was the only coating to have even a partly acceptable cohesion failure mechanism.

Example 6

A coating was formulated as in Example 1 using 1% silane on polymer solids and applied to silicone roof coating substrate, weathered 10 years on a flat roof in South Florida. Prior to coating. The substrate was powerwashed with water @ 26 MPa. The coating was applied by brush to yield a 0.5 mm thick dry coating and tested for adhesion to the substrate. Results are shown in Table 7, below.

TABLE 7

Adhesion to Weathered Silicone Roof Coating

| | Adhesion (N) | | Failure Mechanism |
|---|---|---|---|
| Example | Dry | Wet | Wet |
| 6A Comparative Emulsion copolymer A | 1.5 | 2.9 | A |
| 6B Emulsion copolymer A and glycidoxypropyl trimethoxysilane | 0.9 | 0.8 | A |
| 6C Emulsion copolymer A and vinyl trimethoxysilane | 1.8 | 1.6 | A |
| 6D Emulsion copolymer A and aminoethylaminopropyl trimethoxysilane | 1.9 | 3.5 | D |
| 6E Emulsion copolymer A and glycidoxypropylmethyl diethoxysilane | 1.7 | 1.6 | A |

As shown in Table 7, above, adhesion to a weathered silicone roof coating is improved for the amino alkoxysilane containing emulsion copolymer formulation, which was the only coating to have an acceptable failure mechanism.

Example 7

A coating was formulated as in Example 1 except the silane levels were varied as shown below. The TPO membrane substrate used is a Firestone 45 mil TPO weathered 4 years at Spring House Farm Exposure Station, Spring House, Pa. and was powerwashed with water @ 26 MPa. The coating was tested for adhesion to the substrate. Results are shown in Table 8.

As shown in Table 8, below, coatings formulated with an amino alkoxysilane have substantially improved adhesion at use levels of 0.6 wt. % and higher, based on emulsion polymer solids. Also, the coatings with 0.6 and 1.0 wt. % of the amino alkoxysilane exhibited an acceptable failure mechanism.

TABLE 8

Wet Adhesion to Weathered TPO vs. Silane Level

| Example | Wet Adhesion (N) | Failure Mechanism |
|---|---|---|
| 7A Comparative Emulsion copolymer A | 2.4 | A |
| 7B Emulsion copolymer A and 0.2% aminoethylaminopropyl trimethoxysilane | 3.5 | A |
| 7C Emulsion copolymer A and 0.4% aminoethylaminopropyl trimethoxysilane | 1.1 | A |
| 7D Emulsion copolymer A and 0.6% aminoethylaminopropyl trimethoxysilane | 5.4 | D |
| 7E Emulsion copolymer A and 0.8% aminoethylaminopropyl trimethoxysilane | 5.3 | A |
| 7F Emulsion copolymer A and 1.0% aminoethylaminopropyl trimethoxysilane | 5.1 | D |

Example 8

A coating was formulated as in Example 1, except that the emulsion copolymer comprised a blend of 75 wt. % Emulsion copolymer B and 25 wt. % Emulsion copolymer A with 1 wt. % aminoethylaminopropyl trimethoxysilane, based on total polymer solids, and 0.25% dispersant, and the PVC content was varied as shown in Table 9, below. The coating was applied by brush to yield a dry film thickness of 0.5 mm to a TPO roofing membrane that was weathered on a flat roof for 6 months in Spring House, Pa. Prior to coating, the TPO membrane was sprayed with Rinseable Primer™ RP-1 (an aq. nonionic surfactant solution) at 11 $m^2$/L and cleaned using a 26 MPa powerwasher. Results are shown in Table 9, below.

TABLE 9

Adhesion to 6 Month Weathered Carlisle TPO: Coatings % PVC, TiO2 & Dispersant Variations

| Example | Dispersant | % PVC | TiO2 Kg/1000 L | Wet Adhesion (N) | Failure Mech. |
|---|---|---|---|---|---|
| 8A | Tamol ™ 850 (sodium poly MAA, High MW) | 41 | 120 | 2.8 | D |
| 8B | Tamol ™ 850 | 41 | 120 | 3.0 | D |
| 8C | Tamol ™ 850 | 45 | 120 | 2.6 | A |
| 8D | Tamol ™ 850 | 45 | 96 | 1.7 | A |
| 8E | Tamol ™ 850 | 41 | 120 | 2.8 | D |
| 8F | Tamol ™ 850 | 45 | 120 | 1.7 | A |
| 8G | Tamol ™ 850 | 45 | 96 | 1.9 | A |
| 8H (control) | DisperByk ™ 190 | 41 | 120 | 0.7 | A |
| 8I (control) | DisperByk ™ 190 | 45 | 96 | 1.1 | A |
| 8J (control) | Sodium salt of emulsion copolymer 80 BA/20 MAA, MW 3,800 | 41 | 120 | 2.4 | A |
| 8K (control) | Sodium salt of emulsion copolymer 80 BA/20 MAA, MW 3,800 | 45 | 96 | 2.2 | A |
| 8L (control) | Primal ™ I-1955 (acrylic emulsion copolymer) | 41 | 120 | 0.4 | A |
| 8M (control) | Primal ™ I-1955 | 45 | 96 | 0.4 | A |

As shown in Table 9, above, adhesion is improved for Examples 8A, 8B and 8E using a sodium homopoly MAA hydrophilic dispersant and a 41% PVC and gave better adhesion to weathered TPO and acceptable coating failure. Formulations with a higher % PVC of 45% in examples 8C, 8D, 8F and 8G did not give acceptable coating failure. Further, formulations in Examples 8H, 8I, 8J, 8K, 8L and 8M with emulsion copolymer dispersants that are emulsion copolymers or block copolymers having more than 20 wt. % of blocks made from monomers that do not make water soluble homopolymers at the weight average molecular weight of the dispersant block in use, i.e. that are not hydrophilic, give an unacceptable adhesion failure mechanism.

Examples 9-22

Coatings were formulated to a 41% PVC in Emulsion copolymer A, using 1% aminoethylaminopropyl trimethoxysilane on polymer solids, 120 Kg/1000 L Ti02 and 0.25% dispersant, and the extender loading as indicated in Table 10, below. In all coating formulations, in Examples 9-22, the pigment and extender levels were at Kg/1000 liters. Unless otherwise indicated, all formulations have 0.25% Tamol™ 850 dispersant and 1% aminosilane on polymer solids. Example C1 has no silane. The coatings were tested for adhesion to the unweathered TPO membrane substrates indicated (Firestone 1.14 mm (45 mil) unweathered white TPO and Carlisle 1.14 mils (45 mil) white TPO) below and the results are shown in Table 10, below.

TABLE 10

Filler Selection & Effect on Adhesion to Unweathered TPO

| EXAMPLE | Filler (chemical name; weight average particle size) | Wet Adhesion (N/cm) | |
|---|---|---|---|
| | | Firestone | Carlisle |
| C1 (control) | Omya 12; calcium carbonate; 12 μm | 1.3 A | 2.8 A |
| 9 | Omya 12; calcium carbonate; 12 μm | 2.4 A | 4.1 D |
| 10 | Atomite; calcium carbonate; 10 μm | 2.0 A | 3.6 D |
| C4 (control) | Omya 2; calcium carbonate; 2 μm | 1.9 A | 3.0 A |
| C5 (control) | Omya UF, calcium carbonate, 0.8 μm | 0.6 A | 1.7 A |
| C6 (control) | Kadox ™ 915, zinc oxide, 0.13 μm | 1.5 A | 2.4 A |
| C7 (control) | ZCPP (zinc calcium polyphosphate) 2.7 μm | 0.4 A | 0.9 A |
| 11 | Icecap K; clay; 1.0 μm | 2.1 A | 4.1 D |
| 12 | Icecap K; clay; 1.0 μm | 1.9 A | 4.3 A |
| 13 | ASP-170; clay; 0.4 μm | 1.7 A | 3.4 D |
| 14 | ASP-170; clay; 0.4 μm | 1.9 A | 3.7 D |
| 15 | Minex 4; nepheline syenite; 7.5 μm | 3.0 A | 3.4 D |
| 16 | Minex 4; nepheline syenite; 7.5 μm | 2.2 A | 3.7 D |
| 17 | Nytal 300; talc; 6.9 μm | 2.4 A | 5.2 D |

TABLE 10-continued

Filler Selection & Effect on Adhesion to Unweathered TPO

| EXAMPLE | Filler (chemical name; weight average particle size) | Wet Adhesion (N/cm) Firestone | Carlisle |
|---|---|---|---|
| 18 | Nytal 300; talc; 6.9 µm | 1.3 A | 8.4 C |
| 19 | Mica 375; 25 µm | 2.6 A | 2.0 D |
| 20 | Mica 375; 25 µm | 1.7 A | 5.6 D |
| 21 | Solem ™ 432; aluminum trihydrate; 9 µm | 2.1 A | 4.1 D |
| 22 | Solem ™ 432; aluminum trihydrate; 9 µm | 2.0 A | 3.7 D |

As shown in Table 10, above, in Examples C6 and C7 zinc containing materials decrease adhesion to the substrate. Further, as shown in Examples C4 and C5, small particle size calcium carbonate extenders decrease adhesion to the substrate. Clay extenders in Examples 11, 12, 13 and 14, Minex™ 4 in Examples 15 and 16 and Solem® 432 in Examples 21-22 perform similar to the $CaCO_3$ extenders of Examples 9 and 10. Talc in Examples 17 and 18 and mica in Examples 19 and 20 gave acceptable results on the Carlisle weathered TPO, and improve adhesion, especially on the Carlisle weathered TPO.

Example 23

A coating was formulated as in Example 11, above, except Emulsion Copolymer C was used, with 1% aminoethylaminopropyltrimethoxysilane on polymer solids, 120 Kg/1000 liters of TiO2 and 0.25% Tamol 850 dispersant. The coatings were tested for adhesion to weathered Carlisle TPO substrate and weathered Stevens TPO substrate. Coated panels were dried at 50° C. Results are shown in Table 11, below.

TABLE 11

Various Emulsion Copolymers in Adhesion to Weathered TPO

| Example | Wet Adhesion (N) | Failure Mech. | Wet Adhesion (N) | Failure Mech. |
|---|---|---|---|---|
| | Substrate | | | |
| | Weathered Carlisle | | Weathered Stevens | |
| 23A Comparative Emulsion copolymer B | 0.7 | A | 2.4 | D |
| 23B Blend of 75% Emulsion copolymer B, 25% Emulsion copolymer A | 2.6 | D | 3.2 | D |
| 23C Emulsion copolymer C | 3.5 | D | 2.8 | D |

As shown in Table 11, above, coatings in Examples 23B and 23C have improved adhesion to TPO when aminoalkoxysilane is used with various emulsion copolymers, including Emulsion Copolymer C which is an ethylhexyl acrylate (EHA) copolymer.

Example 24

A coating was formulated as in Example 1 except emulsion copolymer C was used with 1% aminoethylaminopropyl trimethoxysilane on polymer solids, 120 Kg/1000 liters Ti02 and 0.25% Tamol 850 disperant. The coatings were tested for adhesion to weathered Carlisle TPO substrate and weathered Stevens TPO substrates. Coated panels were dried at 60° C. Results are shown in Table 12, below.

TABLE 12

Various Emulsion Copolymers in Adhesion to Weathered TPO

| Example | Wet Adhesion (N) | Failure Mech. | Wet Adhesion (N) | Failure Mech. |
|---|---|---|---|---|
| | Substrate | | | |
| | Weathered Carlisle | | Weathered Stevens | |
| 24A Comparative Emulsion copolymer B | 0.6 | A | 2.6 | A/D |
| 24B Blend of 75% Emulsion copolymer B, 25% Emulsion copolymer A | 3.9 | D | 3.2 | D |
| 24C Emulsion copolymer C | 3.3 | D | 2.8 | D |

As shown in Table 12, above, the coatings in Examples 24B and 24C have improved adhesion to TPO when aminoalkoxysilane is used with various emulsion copolymers, including Emulsion Copolymer C which is an ethylhexyl acrylate (EHA) copolymer.

We claim:

1. An aqueous coating composition for weathered elastomeric substrates comprising (i) one or more emulsion copolymer having a glass transition temperature (Tg) of from −25° C. to 20° C., a weight average molecular weight of from 50,000 to 150,000, and a weight average particle size of from 100 to 500 nm, the emulsion copolymer prepared by copolymerizing a monomer mixture of (a) 20 wt. % or more of one or more hydrophobic monomer chosen from $C_6$ to $C_{24}$ alkyl (meth)acrylates, (b) up to 20 wt. % of one or more vinyl aromatic monomer, wherein the weight of monomers (a) and (b) together constitute at least 25 wt. % or more, of the total weight of the monomer mixture, (c) from 0.5 wt. % to 75 wt. %, of one or more vinyl comonomer, and (d) 0.2 to 5 wt. % of one or more ethylenically unsaturated acid functional monomer, all monomer weight % s based on the total weight of monomers in the monomer mixture used to make the emulsion copolymer, (ii) one or more aminosilane, and (iii) the combination of one or more pigment, extender or filler with one or more hydrophilic dispersant, wherein the composition is substantially zinc free.

2. The composition as claimed in claim 1, wherein the emulsion copolymer (i) is copolymerized from 30 wt. % or more of monomer (a).

3. The composition as claimed in claim 1, wherein monomer (a) is a $C_8$ to $C_{18}$ alkyl (meth)acrylate.

4. The composition as claimed in claim 1, wherein the aminosilane (ii) is amino alkoxysilane.

5. The composition as claimed in claim 1, wherein the amount of hydrophilic dispersant ranges from 0.1 wt. % to 2.0 wt. %, based on the total weight of pigment, filler and extender solids.

6. The composition as claimed in claim 5, which is a white roof coating composition.

7. The composition as claimed in claim 1 having a VOC content of 100 g/L or less.

8. The composition as claimed in claim 1, wherein the Tg of the emulsion copolymer (i) is 5° C. or less.

9. A method of using the composition as claimed in claim 1 comprising applying the coating composition a weathered elastomeric substrate, and drying.

10. A substrate coated with the composition as claimed in claim 1, which substrate is chosen from weathered TPO, new TPO, patched TPO, new modified bitumen, weathered modified bitumen, weathered silicone rubber roof coating, or EPDM rubber.

* * * * *